O. A. PARKER.
WRENCH WITH UNIVERSAL JOINT.
APPLICATION FILED JAN. 8, 1917.
1,276,953.
Patented Aug. 27, 1918.
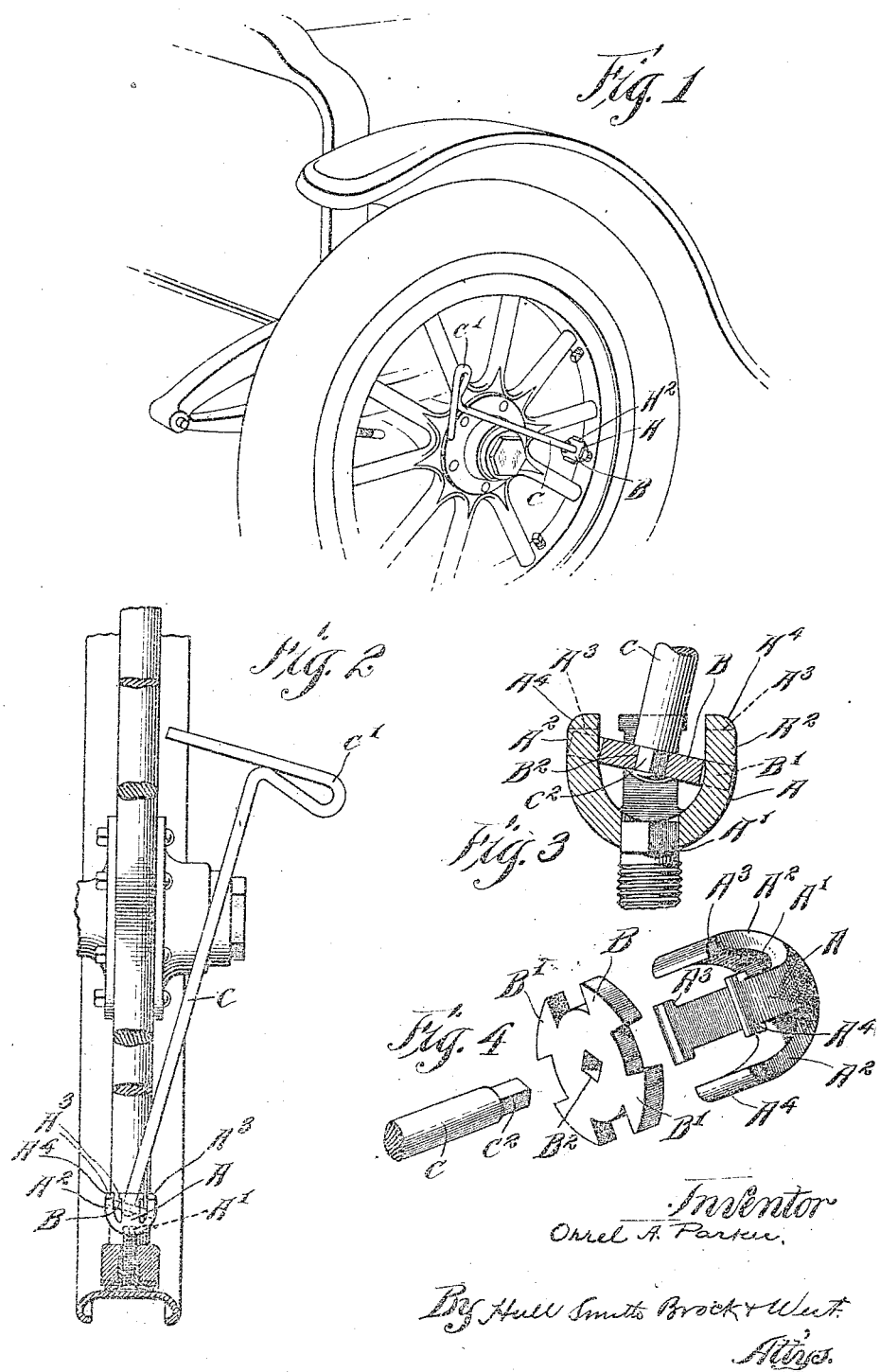

UNITED STATES PATENT OFFICE.

ORREL A. PARKER, OF CLEVELAND, OHIO.

WRENCH WITH UNIVERSAL JOINT.

1,276,953. Specification of Letters Patent. Patented Aug. 27, 1918.

Application filed January 8, 1917. Serial No. 141,083.

*To all whom it may concern:*

Be it known that I, ORREL A. PARKER, a citizen of the United States, residing at Cleveland, in the county of Cuyahoga and State of Ohio, have invented a certain new and useful Improvement in Wrenches with Universal Joints, of which the following is a full, clear, and exact description, reference being had to the accompanying drawings.

This invention relates generally to universal joints and more particularly to one forming a part of a wrench designed for use in connection with automobile wheels having radial and lateral bolts for tensioning and fastening the tire carrying rim upon said wheel.

It will be understood, however, that this improved universal joint can be used wherever a universal connection is desired and the principal object of this invention is to provide a universal joint which is exceedingly simple in construction, consists of a minimum number of parts, is cheap to manufacture and easy to manipulate.

The wrench embodying my improved universal joint is designed for use upon wheels having radial bolts for tensioning the rim upon the wheel body, such as shown in my Patent No. 1,188,200 June 20, 1916, and is intended to supersede the ratchet wrench being quicker, easier, more positive and surer in operation.

Broadly speaking, my invention consists of a driving member and a driven member, said members having engaging means adapted to hold said members in universal moving relation to each other, and my improved wrench may be said to comprise a handle having a driving member at the end thereof, which driving member is connected in universal moving relation with a socket member which is adapted to receive the bolt or nut to be turned.

The invention also includes certain detail features of construction and also certain novel features of combination, all of which will become apparent as the description proceeds.

In the drawings forming a part of this specification, Figure 1 is a view showing the practical application of my invention; Fig. 2 is a detail view partly in section and illustrating the manner of using the same; Fig. 3 is a detail sectional view of the driving and driven member; Fig. 4 is a view of the parts detached or disconnected.

In carrying out my invention, I employ a driven member A which is made of metal and comprises a central portion having a polygonal shaped aperture, or socket $A'$ which receives the head of the bolt or the nut to be turned. The member A is preferably formed with integral retaining fingers $A^2$ spaced at suitable distances apart and having their ends slightly enlarged or expanded laterally as shown at $A^3$. The fingers $A^2$ together with the central portion are curved upon the arc of a circle so that the driven member as a whole is essentially hemispherical in shape; and the outer ends of the fingers are rounded off or cut away as shown at $A^4$.

The curved form of the body and fingers and these cut off edges enables one to use this type of wrench upon bolts and nuts arranged upon the side of a wheel felly upon which an overhanging flanged rim is arranged.

The driving member is also of metal and corresponds in size with the driven member and is formed with lateral projections $B'$, which fit between the spaced retaining fingers $A^2$, and the ends $A^3$ of the fingers prevent these parts becoming disconnected, but the retaining fingers and the lateral projections are so constructed and so designed that the members A and B have a free universal movement with reference to each other.

The driving member B is connected to the end of a handle C and turns therewith, the handle being preferably made from a piece of rod iron of suitable dimensions bent back upon itself at its outer end to provide a convenient and suitable sized handle $C'$, the opposite end being reduced as shown at $C^2$ and fitted into and secured in the central opening $B^2$ produced in the driving member B, and if desired this driving member B can be "upset" upon the end of the rod, thus making the entire wrench of two parts only.

The retaining fingers could be carried by the driving member, and furthermore they could be attached to either or both of these parts instead of being integral parts thereof, and they can be of any shape which will maintain these parts in close universal working relation with each other.

In operation the socket portion or driven member is fitted upon the bolt to be turned, and then the handle is rotated, carrying with it the driving member, which in turn rotates the driven member which is in engagement with the bolt or nut to be turned. The handle is of sufficient length to have the handle C' clear the hub, when placed at an oblique angle as shown in Fig. 2, but owing to the universal joint between the parts A and B the bolt will be quickly turned in the desired direction. The wrench is equally as well adapted for turning the bolts or nuts of lateral clamps upon the felly of the wheel, and can be used wherever a socket wrench of the usual construction can be employed. The parts being punched or forged, the wrench can be quickly and easily made and at a comparatively small cost.

While I have shown and described the interengaging parts of this wrench shaped and connected for universal movement, it is obvious that they can be rigidly connected together thereby providing an exceedingly cheap and highly efficient socket wrench, and if such parts, once rigidly connected, should become somewhat loosened, the slight movement would not be detrimental, as the turning power of the wrench would not be impaired in the least.

Having thus described my invention, what I claim is:—

1. A wrench comprising a socket member having radial projections, a driving member provided with projections adapted to engage the projections of the socket member, the engagement between the socket and driving members being capable of a universal movement, the driving member being provided with means for turning it and the socket member in unison.

2. A wrench comprising a socket member having radial projections, a handle terminating in a driving member provided with radial projections adapted to engage the projection of the socket member, the connection between the socket and driving member being capable of universal movement.

3. A wrench comprising a handle terminating in a driving member provided with lateral projections, a socket member having radial projections, said projections being adapted to engage each other and constitute a universal joint, one of said members being provided with means to prevent disconnection.

4. A wrench comprising a socket member having curved radial fingers provided with enlarged free ends, a driving member having lateral projections adapted to fit between the fingers of said socket member, and a handle connected to said driving member.

5. A wrench comprising a handle terminating in a driving member having laterally projecting portions, a socket member having an apertured central portion and upturned side portions together with means to prevent disconnection of said parts.

In testimony whereof, I hereunto affix my signature.

ORREL A. PARKER.